July 30, 1957 — H. B. WRIGHT — 2,800,918
SAFETY REGULATOR FOR FLUIDS
Filed June 21, 1954 — 2 Sheets-Sheet 2

INVENTOR.
Harold B. Wright
BY
Bair, Freeman & Molinare

United States Patent Office 2,800,918
Patented July 30, 1957

2,800,918

SAFETY REGULATOR FOR FLUIDS

Harold B. Wright, Marshalltown, Iowa, assignor to Fisher Governor Company, Marshalltown, Iowa, a corporation of Iowa Application June 21, 1954, Serial No. 438,002

7 Claims. (Cl. 137—461)

This invention relates to pressure regulators for fluid flow systems and more particularly to safety shut-off regulators.

This particular invention is an improvement over the safety shut-off regulator shown and described in the copending application, Serial No. 427,908 filed May 6, 1954, and now issued as Patent No. 2,698,026.

In said copending application, there is described a safety shut-off regulator having separable members interconnecting a pressure sensitive means and the actuating means for the valve of said regulator, which separable members form a rupturable connection that becomes operative to disconnect the pressure sensitive means from the actuating means in the presence of an undesirable pressure condition and upon failure of the regulator to properly control, or modify, the undesirable pressure condition.

The pressure sensitive means in said copending application is subject to a wide range of movements responsive both to the high and low fluid pressures obtained in the regulator. While both abnormally high and low pressure conditions are, or may be, dangerous, for some services a low pressure cutout is not desired. One specific service in which a low pressure cutout is not desired is where the inlet pressure to the regulator can drop to a low value close to the reduced pressure from the regulator. In this case even though the inlet pressure may not have dropped to a dangerously low value, the regulator low pressure cutout may operate the shutting down of the system, when such action would not be desired. Under such conditions, it is desirable to eliminate the low pressure cutout.

There remains, however, the danger of the high pressure condition. In systems where it is desirable to eliminate the low pressure cutout, the range of flexing of the pressure sensitive means of the regulator may be greatly reduced by obviating movement of said pressure sensitive means in response to a low fluid pressure condition where the low pressure cutout of the regulator has been eliminated. The eliminating of flexing of the pressure sensitive means in response to low pressure conditions will greatly extend the life of the pressure sensitive means.

Thus, one object of this invention is to provide a safety shut-off fluid pressure regulator having pressure sensitive means therein, wherein response to low fluid pressure conditions has been substantially eliminated to reduce the over-all range of flexure of the pressure sensitive means and to thereby extend the effective operating life of the regulator.

The reduction in flexure of the pressure sensitive means poses a problem in providing means for accomplishing the reconnecting of the pressure sensitive means to the actuating means after the separable members have been disconnected.

Accordingly, it is another object of this invention to provide a safety shut-off fluid pressure regulator wherein response to low pressure conditions has been eliminated and including separable members operative for separation under high pressure conditions, and which regulator is provided with a novel arrangement of parts whereby there is afforded means for reconnecting the separable members.

Further objects and advantages of this invention will become apparent as the following description proceeds and the features of novelty which characterize this invention will be pointed out with particularity in the claims annexed to and forming part of this specification.

A preferred embodiment of this invention is shown in the accompanying drawings, in which.

Figure 3:
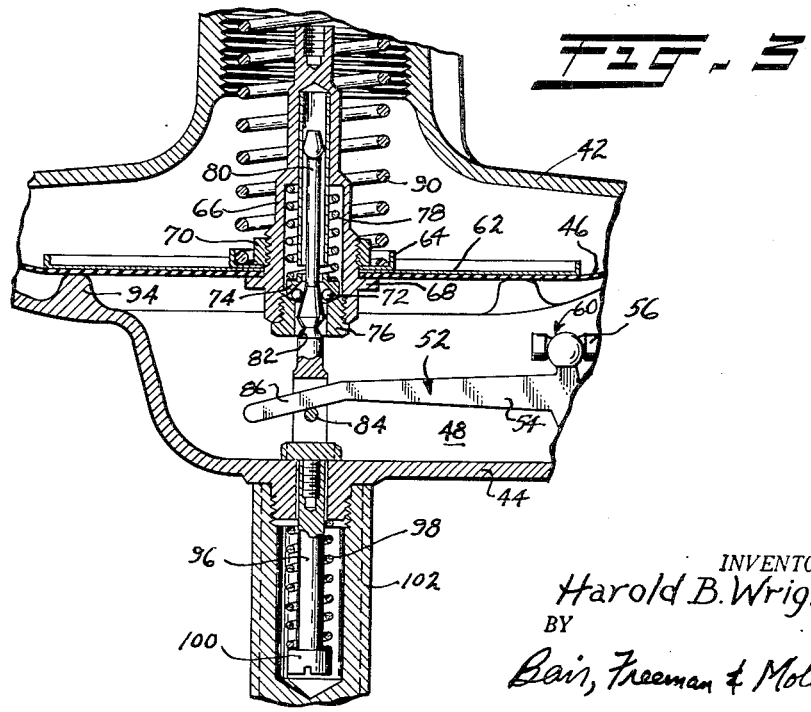

Figure 3 is a view showing the parts of the regulator in a position after the pressure sensitive means has been disconnected from the actuating means of the regulator and after the high pressure has been released from the system. Under a high pressure condition, after the pressure sensitive means has been disconnected from the actuating means of the regulator, if the high pressure has not yet been relieved or released, the diaphragm would be in the extreme up position. Figure 3 shows the diaphragm in a lowered position after the high pressure has been released from the system.

Figure 1:
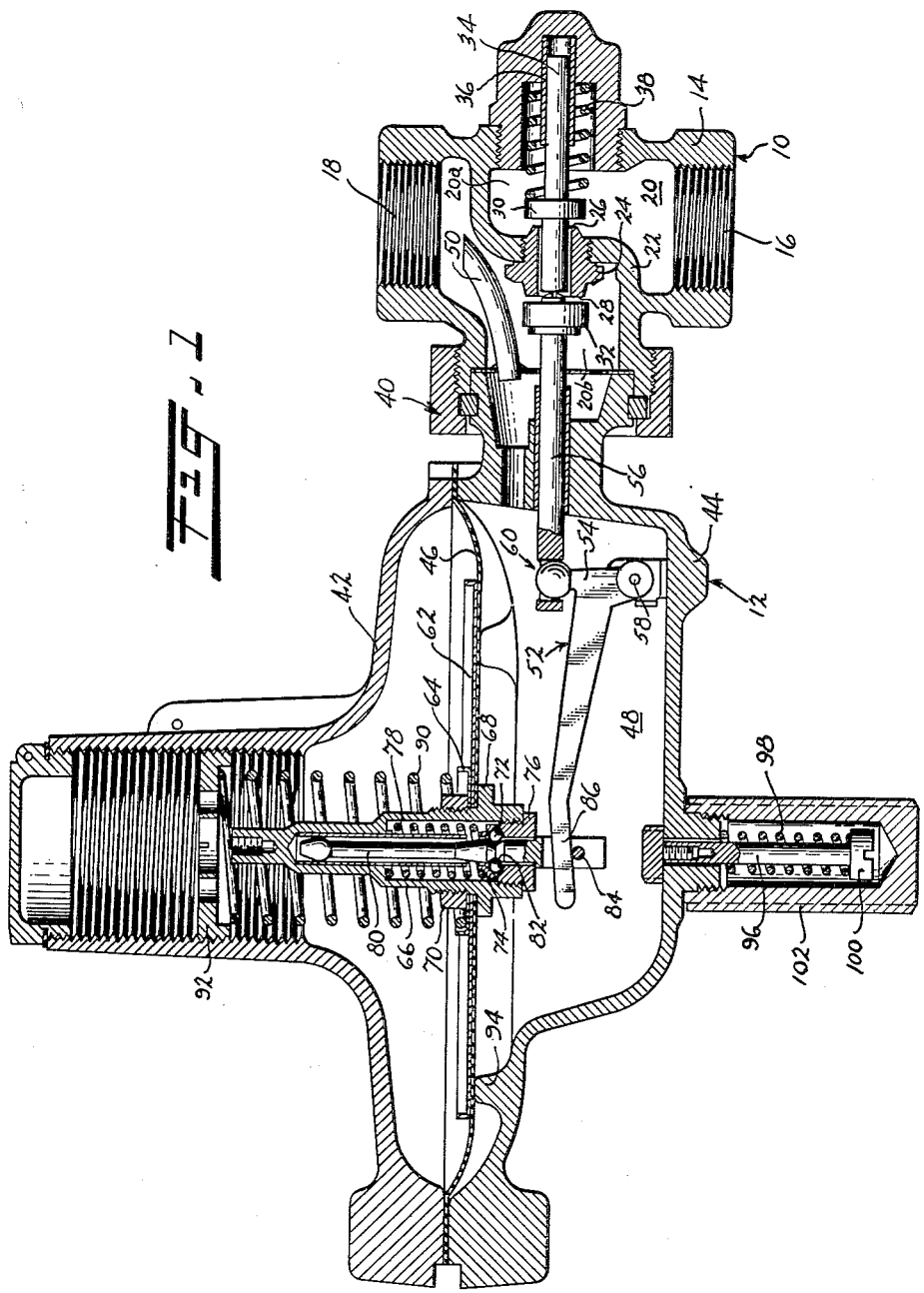
Figure 1 is a cross-section view of the regulator showing the pressure sensitive means at its lower limit of range of movement.
Figure 2:
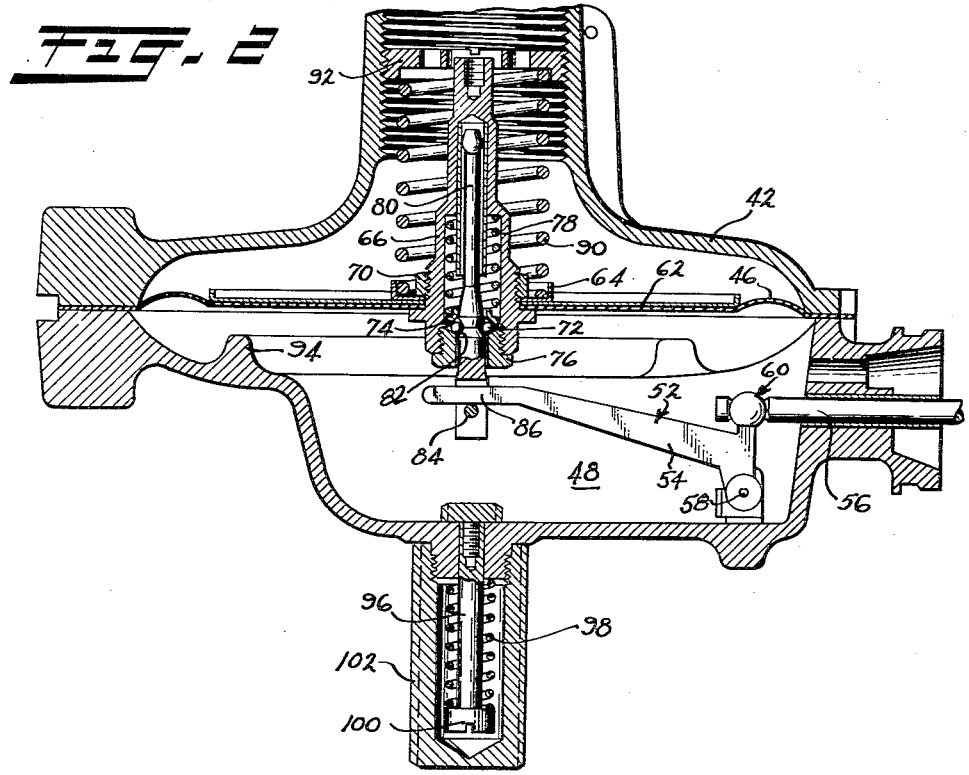
Figure 2 is a fragmentary view of the regulator showing the pressure sensitive means in a position where it is responsive to the fluid pressure and where it is operative to control the fluid pressure.

Referring now to the figures, there is shown in Figure 1 a control valve which includes a flow regulating portion generally indicated at 10, and a controller generally indicated at 12 for controlling the flow through said flow regulating portion. The flow regulating portion 10 includes a valve body 14 having an inlet 16 and an outlet 18 and defining a fluid flow passageway 20 therethrough. There is an internal wall portion 22 in the valve body 14 which divides the flow passageway 20 into a downstream portion 20b and an upstream portion 20a. An orifice member 24 is mounted in wall portion 22 and provides upstream and downstream valve seats respectively indicated at 26 and 28. Mounted in the valve body 14 are a pair of interconnected spaced valve members 30 and 32 which are adapted to seat respectively on seats, or valve orifices, 26 and 28 in response to movement of a pressure responsive means located in the controller 12. In the position of the parts shown in Figure 1 both the valve orifices 26 and 28 are opened.

The valve member 30 carries a stem 34 which is positioned for purposes of alignment in a tubular insert 36 carried by valve body 14. A spring 38 is positioned between the valve member 30 and the valve body 14 for normally biasing the valve member 30 toward the valve seat 26.

Referring now to the controller, said controller 12 is secured to the valve body 14 by means of a nut-type connector generally indicated at 40. The controller 12 includes a control means within a housing. The housing is defined by an upper casing 42 and a lower casing 44. A pressure sensitive means, diaphragm 46, formed of some suitable elastic material, such as rubber or the like, is positioned between the upper and the lower casings 42 and 44, and the assembly is appropriately secured together. The lower casing 44 and the diaphragm 46 cooperate to define a pressure chamber 48 therebetween. The pressure chamber 48 communicates with the downstream portion 20b of the flow passageway 20, at a point downstream of the orifice member 24, by means of a Pitot tube, or breather tube, 50. The Pitot tube 50 and its mounting is preferably of the construction disclosed in U. S. Patent No. 2,619,983.

The fluid pressure in flow passageway 20 is communicated by means of tube 50 to the chamber 48. A rise in fluid pressure causes the diaphragm 46 to move upwardly in a first direction, and a fall in fluid pressure causes the diaphragm 46 to tend to move downwardly, or in a second direction.

Within the pressure chamber 48, there is an actuating means, generally indicated at 52, which provides an operative connection between the diaphragm 46 and the valve members 30 and 32. The actuating means 52 includes a bell crank 54 and an actuating rod, or link, 56 which is connected to said valve member 32, and by means thereof to valve member 30. The bell crank 54 is pivotally mounted on a pin 58 which is mounted on the lower casing 44. There is a ball and socket connection generally indicated at 60 for transmitting the motion from the bell crank 54 to the rod 56, and vice versa.

The actuating means 52 are detachably connected to diaphragm 46 by means which will now be described. The diaphragm 46 carries a dished stiffening plate 62, and a cup-shaped member 64 located substantially centrally of the stiffening plate 62. The diaphragm 46 also carries a tubular member 66 which is secured to the diaphragm 46, by means of a flange 68 on tubular member 66, and a nut 70 which cooperates with flange 68 to clampingly secure the member 66 to the diaphragm 46. The tubular member 66 carries a plurality of balls 72 positioned between an annular beveled washer 74 and an annular beveled nut 76; and a resilient spring 78 biases the washer 74 toward nut 76.

An elongated connecting member 80 extends into tubular member 66 and has an annular beveled-wall recess 82 formed therein for cooperatively receiving the balls 72. The connection between members 66 and 80 is rupturable upon sufficient separating force being supplied to said members to overcome the clasping force, between balls 72 and member 80, which is developed by said resilient means. The lower end of member 80 is bifurcated to receive the extended end 86 of bell crank 54 and said member 80 carries a pin 84 for operative engagement with said bell crank 54.

A spring 90 is positioned in the upper casing 42 between an adjustable stop 92 and the cup-shaped member 64 for providing an initial downward biasing force to the diaphragm 46. Under the influence of a high pressure in the pressure chamber 48, the diaphragm 46 rises and the actuating means 52 accompanies movement of the diaphragm 46 until the valve member 32 engages the valve seat 28. Thereafter, further increase in fluid pressure in chamber 48 tends to raise the diaphragm 46, but the means for limiting further movement of the actuating means 52 prevents the actuating means from following. This causes a rupturing of the above-described detachable connection between the diaphragm 46 and the actuating means 52. After the separable members 66 and 80 have been separated, the actuating means 52 is moved to the position shown in Figure 3, by reason of the force of gravity, or of the bias of the spring means 38, or under the influence of both said forces.

The lower casing 44 has formed therein a substantially annular boss 94 which extends upwardly into the pressure chamber 48 and is positioned in the path of movement of the diaphragm 46. The boss 94 is adapted to engage the under side of the diaphragm 46 and limit its downward movement to the position shown in Figure 1. Thus, when the controller 12 is functioning under a low pressure condition, the diaphragm 46 is unresponsive as the diaphgram 46 cannot move downwardly any further than the position shown in Figure 1. This eliminates any unnecessary flexing of the diaphragm 46 during low pressure conditions, such low pressure conditions not being dangerous and not requiring any action on the part of the controller 12.

After the detachable connection between the actuating means 52 and the pressure sensitive diaphragm 46 has been ruptured, causing the parts to take the position shown in Figure 3, it is evident that it is impossible for automatic reconnection of the detachable means to take place because the lower limit of movement of the pressure sensitive diaphragm 46 is insufficient to bring the balls 72 into alignment with the annular recess 82 in the member 80. In order to afford means for resetting the controller 12, there is provided in the lower portion of the lower casing 44 a stem 96 which is adapted to be manually operated upwardly to engage and raise the member 80 to a point where the annular recess 82 will register with the balls 72 so as to reconnect the actuating means 52 with the pressure sensitive diaphragm 46. As can be seen in Figure 1, during normal operation of the controller 12, the stem 96 is normally spaced from the rod 80. The stem 96 is normally maintained in the withdrawn position shown in the figures by means of a concentric helical spring 98 which engages the head 100 of the stem 96 at one end and engages the outer side of the lower casing 44 at its other end. A cap member 102 may be provided for enclosing and protecting the stem 96 and spring 98, and said cap member 102 may be detachably connected to the lower casing 44 by any appropriate means.

From the above description it will be seen that the actuating means 52 has an upper limit to its range of movement, which upper limit is below the upper limit of range of movement of the pressure sensitive diaphragm 46. Furthermore, the pressure sensitive diaphragh 46 has a lower limit to its range of movement, as shown in Figures 1 and 3, which lower limit is above the lower limit of the range of movement of the actuating means 52. However, there is an overlapping of the ranges of movement of the actuating means 52 and of the pressure sensitive means 46 and in that overlapping range, or region, the two are operatively connected to each other for movement under the influence of the pressure in the pressure chamber 48, and within this overlapping range the control valve is operative to control the pressure being delivered by the flow regulating portion 10.

While there has been shown and described a particular embodiment of this invention, it will be apparent to those skilled in the art that various changes and modifications may be made therein without departing from the invention, and, therefore, it is intended in the appended claims to cover all such changes and modifications as fall within the true spirit and scope of the invention.

What I claim is:

1. A valve for use in fluid flow systems comprising a valve body having an inlet and an outlet, said valve body having a fluid flow passageway therethrough, a valve member mounted within said valve body and adapted to selectively open and block said fluid flow passageway when actuated, a pressure sensitive means movably responsive in a first direction in response to a rise in fluid pressure and movable in a second direction in response to a fall in fluid pressure, actuating means for operatively connecting the pressure sensitive means and said valve member, said actuating means and pressure sensitive means being detachably joined together, means limiting the range of movement of said actuating means in said first direction, said pressure sensitive means being movable in said first direction beyond the limit of range of movement of said actuating means, whereupon said actuating means is operatively disconnected from said pressure sensitive means, means limiting the range of movement of said pressure sensitive means in said second direction, means for moving said actuating means in said second direction, after said actuating means is operatively disconnected from said pressure sensitive means, to a point beyond said limit of range of movement of said pressure sensitive means in said second direction, said actuating means and said pressure sensitive means being operative through an overlapping range of movement wherein both the pressure sensitive means and the actuating means are movable in operative association with each other, and means for reconnecting said actuating means with said pressure sensitive means.

2. A valve for use in fluid flow systems comprising a valve body having an inlet and an outlet, said valve body having a fluid flow passageway therethrough, a valve member mounted within said valve body and adapted to selectively open and block said fluid flow passageway when actuated, a pressure sensitive means movably responsive in a first direction in response to a rise in fluid pressure and movable in a second direction in response to a fall in fluid pressure, actuating means for operatively connecting the pressure sensitive means and said valve member, said actuating means and pressure sensitive means being detachably joined together, means limiting the range of movement of said actuating means in said first direction, said pressure sensitive means being movable in said first direction beyond the limit of range of movement of said actuating means, whereupon said actuating means is operatively disconnected from said pressure sensitive means, means limiting the range of movement of said pressure sensitive means in said second direction, said actuating means being movable in said second direction, after said actuating means is operatively disconnected from said pressure sensitive means, to a point beyond said limit of range of movement of said pressure sensitive means in said second direction, said actuating means and said pressure sensitive means being operative through an overlapping range of movement wherein both the pressure sensitive means and the actuating means are movable in operative association with each other, and a manually operable stem positioned for cooperation with said actuating means to move said actuating means into said overlapping range of movement where said actuating means may be operatively reconnected with said pressure sensitive means.

3. A valve for use in fluid flow systems comprising a valve body having an inlet and an outlet, said valve body having a fluid flow passageway therethrough, a valve member mounted within said valve body and adapted to selectively open and block said fluid flow passageway when actuated, a pressure sensitive means movably responsive in a first direction in response to a rise in fluid pressure and movable in a second direction in response to a fall in fluid pressure, actuating means for operatively connecting the pressure sensitive means and said valve member, said actuating means and pressure sensitive means being detachably joined together, means limiting the range of movement of said actuating means in said first direction, said pressure sensitive means being movable in said first direction beyond the limit of range of movement of said actuating means, whereupon said actuating means is operatively disconnected from said pressure sensitive means, means limiting the range of movement of said pressure sensitive means in said second direction, spring means for moving said actuating means in said second direction, after said actuating means is operatively disconnected from said pressure sensitive means, to a point beyond said limit of range of movement of said pressure sensitive means in said second direction, said actuating means and said pressure sensitive means being operative through an overlapping range of movement wherein both the pressure sensitive means and the actuating means are movable in operative association with each other, and a stem for reconnecting said actuating means with said pressure sensitive means, said stem being positioned for operation thereof into engagement with said actuating means to move said actuating means into said overlapping range where said actuating means may be operatively reconnected with said pressure sensitive means.

4. A valve for use in fluid flow systems comprising a valve body having an inlet and an outlet, said valve body having a fluid flow passageway therethrough, a valve member mounted within said valve body and adapted to selectively open and block said fluid flow passageway when actuated, control means operatively associated with said valve member, a casing for said control means, said control means including a pressure sensitive diaphragm mounted on said casing and cooperating with said casing to define a pressure chamber therebetween, said diaphragm being movably responsive in a first direction in response to a rise in fluid pressure and movable in a second direction in response to a fall in pressure, actuating means detachably connected to said diaphragm and operatively connecting said diaphragm and said valve member, means limiting the range of movement of said actuating means in said first direction, said diaphragm being movable in said first direction to a point beyond said limit of movement of said actuating means, whereupon said actuating means is operatively disconnected from said diaphragm, a boss on said casing extending into said pressure chamber and being positioned in the path of movement of said diaphragm to engage said diaphragm to limit the movement thereof in said second direction, said actuating means, after being disconnected from said diaphragm, being movable in said second direction beyond the limit of movement of said diaphragm in said second direction, whereupon automatic reconnecting of said diaphragm with said actuating means may be frustrated, and a stem carried by said casing for reconnecting said actuating means with said diaphragm, said stem being positioned for operation thereof into engagement with said actuating means to move said actuating means to a position where it may be operatively reconnected to said diaphragm.

5. A valve for use in fluid flow systems comprising a valve body having an inlet and an outlet, said valve body having a fluid flow passageway therethrough, a valve member mounted within said valve body and adapted to selectively open and block said fluid flow passageway when actuated, control means operatively associated with said valve member, a casing for said control means, said control means including a pressure sensitive diaphragm mounted on said casing and cooperating with said casing to define a pressure chamber therebetween, said diaphragm being movably responsive in a first direction in response to a rise in fluid pressure and movable in a second direction in response to a fall in pressure, actuating means detachably connected to said diaphragm and operatively connecting said diaphragm and said valve member, means limiting the range of movement of said actuating means in said first direction, said diaphragm being movable in said first direction to a point beyond said limit of movement of said actuating means, whereupon said actuating means is operatively disconnected from said diaphragm, a boss on said casing extending into said pressure chamber and being positioned in the path of movement of said diaphragm to engage said diaphragm to limit the movement thereof in said second direction, said actuating means, after being disconnected from said diaphragm, being movable in said second direction beyond the limit of movement of said diaphragm in said second direction, whereupon automatic reconnecting of said diaphragm with said actuating means may be frustrated, and a resetting stem carried by said casing and disposed on the side of said boss opposite said diaphragm and positioned for operation thereof into engagement with said actuating means to move said actuating means to a position where it may be operatively reconnected to said diaphragm.

6. A valve for use in fluid systems comprising a valve body having an inlet and an outlet, said valve body having a fluid flow passageway therethrough, a valve member mounted within said valve body and adapted to selectively open and block said fluid flow passageway when actuated, control means operatively associated with said valve member, a casing for said control means, said control means including a pressure sensitive diaphragm mounted on said casing and cooperating with said casing to define a pressure chamber therebetween, said diaphragm being movably responsive in a first direction in response to a rise in fluid pressure and movable in a second direction in response to a fall in pressure, actuating means detachably connected to said diaphragm and operatively connecting said diaphragm and said valve member, means limiting the range of movement of said actuating means in said first direction, said diaphragm being movable in said first direction to a point beyond said limit of movement of said actuating means, whereupon said actuating means is operatively disconnected from said diaphragm, a boss on said casing extending into said pressure chamber and being positioned in the path of movement of said diaphragm to engage said diaphragm to limit the movement thereof in said second direction, spring means for moving said actuating means, in said second direction beyond the limit of movement of said diaphragm in said second direction, after said actuating means is disconnected from said diaphragm, whereupon automatic reconnecting of said diaphragm with said actuating means is frustrated, and means for reconnecting said actuating means with said diaphragm.

7. A valve for use in fluid flow systems comprising a valve body having an inlet and an outlet, said valve body having a fluid flow passageway therethrough, a valve member mounted within said valve body and adapted to selectively open and block said fluid flow passageway when actuated, control means operatively associated with said valve member, a casing for said control means, said control means including a pressure sensitive diaphragm mounted on said casing and cooperating with said casing to define a pressure chamber therebetween, said diaphragm being movably responsive in a first direction in response to a rise in fluid pressure and movable in a second direction in response to a fall in pressure, actuating means detachably connected to said diaphragm and operatively connecting said diaphragm and said valve member, means limiting the range of movement of said actuating means in said first direction, said diaphragm being movable in said first direction to a point beyond said limit of movement of said actuating means, whereupon said actuating means is operatively disconnected from said diaphragm, a boss on said casing extending into said pressure chamber and being positioned in the path of movement of said diaphragm to engage said diaphragm to limit the movement thereof in said second direction, said actuating means, after being disconnected from said diaphragm, being movable in said second direction beyond the limit of movement of said diaphragm in said second direction, whereupon automatic reconnecting of said diaphragm with said actuating means may be frustrated, and a manually operable resetting stem carried by said casing for reconnecting said actuating means with said diaphragm, said stem being positioned for operation thereof into engagement with said actuating means to move said actuating means to a position where it may be operatively reconnected to said diaphragm.

References Cited in the file of this patent

UNITED STATES PATENTS

| | | |
|---|---|---|
| 2,293,325 | Wood | Aug. 18, 1942 |

FOREIGN PATENTS

| | | |
|---|---|---|
| 501,595 | Germany | July 3, 1930 |
| 39,086 | France | June 1, 1931 |